United States Patent
Tsubone et al.

(10) Patent No.: US 9,352,799 B2
(45) Date of Patent: May 31, 2016

(54) MOTORCYCLE

(71) Applicant: KAWASAKI JUKOGYO KABUSHIKI KAISHA, Kobe-shi, Hyogo (JP)

(72) Inventors: Toshiyuki Tsubone, Kobe (JP); Atsushi Senda, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 14/651,634

(22) PCT Filed: Jul. 22, 2013

(86) PCT No.: PCT/JP2013/004454
§ 371 (c)(1),
(2) Date: Jun. 11, 2015

(87) PCT Pub. No.: WO2014/097504
PCT Pub. Date: Jun. 26, 2014

(65) Prior Publication Data
US 2015/0329166 A1 Nov. 19, 2015

(30) Foreign Application Priority Data

Dec. 17, 2012 (JP) .................................. 2012-274335

(51) Int. Cl.
*B62K 11/00* (2006.01)
*B60K 11/04* (2006.01)
(Continued)

(52) U.S. Cl.
CPC ................. *B62K 11/02* (2013.01); *B62J 35/00* (2013.01); *B62J 99/00* (2013.01); *B62K 11/04* (2013.01); *B62K 19/38* (2013.01); *B62K 25/283* (2013.01); *B62L 3/00* (2013.01)

(58) Field of Classification Search
CPC ................................ B62K 11/02; B62K 19/30
USPC .......................................... 180/229, 218, 219
See application file for complete search history.

(56) References Cited

U.S. PATENT DOCUMENTS

| | | | |
|---|---|---|---|
| 6,213,239 B1 * | 4/2001 | Onishi ..................... | B62J 35/00 180/219 |
| 7,975,795 B2 * | 7/2011 | Asano .................... | B62K 11/04 180/229 |

(Continued)

FOREIGN PATENT DOCUMENTS

| JP | 5945114 U | 3/1984 |
|---|---|---|
| JP | 0534092 U | 5/1993 |

(Continued)

OTHER PUBLICATIONS

ISA Japanese Patent Office, International Search Report Issued in Patent Application No. PCT/JP2013/004454, Oct. 15, 2013, WIPO, 4 pages.

*Primary Examiner* — Tony Winner
(74) *Attorney, Agent, or Firm* — Alleman Hall McCoy Russell & Tuttle LLP

(57) ABSTRACT

A motorcycle (1) comprising a vehicle body frame (4) including a pair of right and left pivot frames (10) which extend continuously from rear portions of main frames (8), respectively, and to which front end portions of a swing arm (9) are mounted such that the swing arm is pivotable; an ABS unit (19) including a pump (19a) and a valve (19b) for the ABS unit; and a reservoir tank (20) including a container body (20a) which stores therein a cooling medium supplied to a radiator (17) and has a cooling medium port, and a cap (20b) which closes the cooling medium port of the container body (20a), wherein the ABS unit (19) and the reservoir tank (20) are disposed inward relative to the pivot frames (10), and mounted to the vehicle body frame (4) via a common bracket (21).

6 Claims, 5 Drawing Sheets

(51) Int. Cl.
*B62K 11/02* (2006.01)
*B62K 25/28* (2006.01)
*B62L 3/00* (2006.01)
*B62J 35/00* (2006.01)
*B62K 11/04* (2006.01)
*B62J 99/00* (2009.01)
*B62K 19/38* (2006.01)

(56) References Cited

U.S. PATENT DOCUMENTS

2006/0054372 A1* 3/2006 Ohzono .................. B62M 7/02
    180/229
2007/0056791 A1* 3/2007 Mano ...................... B62J 99/00
    180/229
2013/0009378 A1* 1/2013 Nagakubo ............. B60T 8/1706
    280/274
2015/0217686 A1* 8/2015 Takasaki .................... B62J 3/00
    280/281.1

FOREIGN PATENT DOCUMENTS

| | | |
|---|---|---|
| JP | 05116663 A | 5/1993 |
| JP | 2009236064 A | 10/2009 |
| JP | 2010023576 A | 2/2010 |
| JP | 2010042756 A | 2/2010 |
| JP | 2010173337 A | 8/2010 |

* cited by examiner

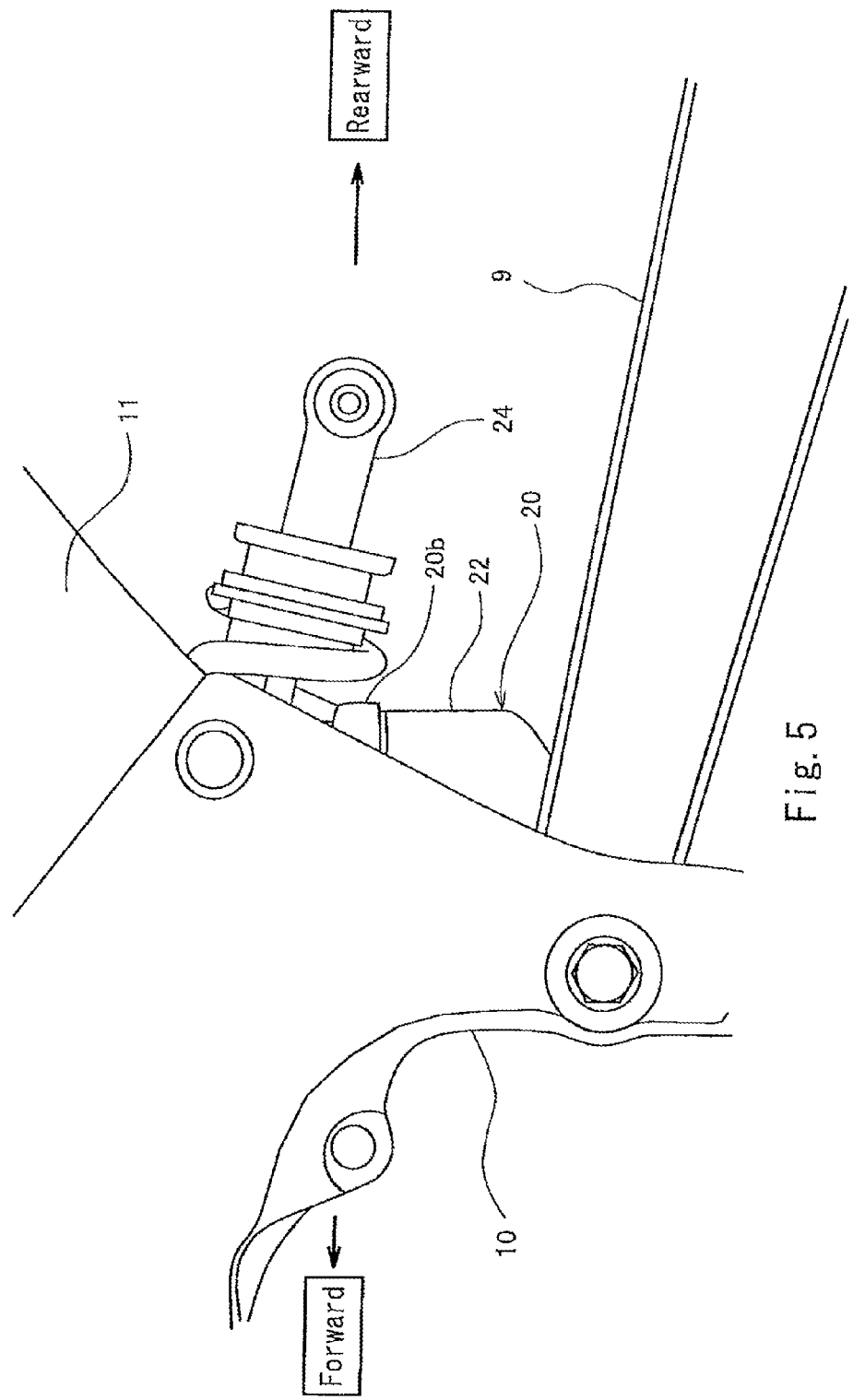

MOTORCYCLE

TECHNICAL FIELD

The present invention relates to a motorcycle including a radiator.

BACKGROUND ART

In a conventional example, a reservoir tank for a radiator of a motorcycle including a water cooling system is disposed in the vicinity of the radiator that is located obliquely above an engine, and the tank is covered with a shroud on the outside (e.g., see Patent Literature 1).

CITATION LIST

Patent Literature

Patent Literature 1: Japanese Laid-Open Patent Application Publication No. 2010-23576

SUMMARY OF INVENTION

Technical Problem

However, in the above conventional motorcycle, since the outside of the reservoir tank is covered with the shroud, the dimension of the front portion of a vehicle body in a vehicle width direction is increased, and there is a limitation on design of the external appearance of the front portion of the vehicle body. Since it is necessary to detach the shroud during maintenance of the reservoir tank, a maintenance operation becomes complex.

The present invention has been developed to solve the above-mentioned problem, and an object of the present invention is to provide a motorcycle which allows the maintenance operation for the reservoir tank for the radiator to be easily performed and the external appearance of the front portion of the vehicle body to be improved.

Solution to Problem

To achieve the above-described object, the present invention provides a motorcycle comprising: a vehicle body frame including a head pipe, a pair of right and left main frames extending rearward from the head pipe, and a pair of right and left pivot frames which extend continuously from rear portions of the main frames, respectively, and to which a front end portion of a swing arm is mounted such that the swing arm is pivotable; a brake control unit; and a reservoir tank including a container body which stores therein a cooling medium supplied to a radiator and has a cooling medium port, and a cap which closes the cooling medium port of the container body, wherein the brake control unit and the reservoir tank are disposed inward relative to the pivot frames, and mounted to the vehicle body frame via a common bracket.

The above brake control unit may be, for example, an ABS (anti-lock brake system) unit for controlling an ABS which reduces a hydraulic brake pressure to prevent locking of a wheel. The ABS unit includes a pump and a valve for the ABS.

In accordance with the above configuration, since the reservoir tank is disposed inward relative to the pivot frames, it becomes possible to prevent a situation in which the width of the front portion of a vehicle body is increased due to the reservoir tank. This can improve the external appearance of the front portion of the vehicle body. In addition, since a space in which the swing arm is pivoted can be ensured in a vicinity of the front end portion of the swing arm in a region that is inward relative to the pivot frames, the reservoir tank disposed inward relative to the pivot frames is accessible through this space. In this way, maintenance can be easily performed. Furthermore, since the ABS unit and the reservoir tank are mounted to the vehicle body via the common bracket, the ABS unit and the reservoir tank are integrated as a sub-assembly by the bracket. Therefore, the components can be reduced in number, and the ABS unit and the reservoir tank can be efficiently mounted to the vehicle body at the same time.

The reservoir tank is disposed in a region between an inner surface of the pivot frames and a center in a vehicle width direction and positioned closer to the center in the vehicle width direction.

In accordance with this configuration, since the reservoir tank is positioned closer to the center in the vehicle width direction, it becomes possible to reduce shaking of the reservoir tank shakes, and thereby suppress significant movement of a cooling medium stored in the reservoir tank, compared to a case where the reservoir tank is disposed in a side portion in the vehicle width direction.

The bracket is connected to the vehicle body frame via a rubber damper. In accordance with this configuration, the rubber damper which serves to prevent a vibration from being transmitted from the vehicle body frame to the brake control unit also prevents a vibration from being transmitted to the reservoir tank. This can suppress the cooling medium stored in the reservoir tank from being moved significantly. The brake control unit may be the ABS unit.

The reservoir tank and the brake control unit are arranged to overlap with each other in a vertical direction.

In accordance with this configuration, when the components of the vehicle body are assembled, the reservoir tank and the brake control unit which are integrated by the bracket can be inserted into a space formed between the pair of right and left pivot frames from above. Therefore, the components of the vehicle body can be assembled efficiently in a limited vehicle body space. The brake control unit may be the ABS unit.

The container body is disposed immediately below the brake control unit, and the cap is disposed to be horizontally apart from the brake control unit.

In accordance with this configuration, since the container body is disposed immediately below the brake control unit and a space in which an operator performs an operation can be ensured in a vicinity of the cap of the reservoir tank while reducing the occupation area of the components when viewed from above. This allows the operator to easily detach the cap and replenish the reservoir tank with the cooling medium. The brake control unit may be the ABS unit.

When viewed from a side, the container body is covered with the pivot frames, and at least a portion of the cap protrudes rearward from the pivot frames.

In accordance with this configuration, the operator can easily detach the cap and replenish the reservoir tank with the cooling medium.

Advantageous Effects of Invention

The present invention is configured as described above, and can achieve an advantage of providing a motorcycle which allows the maintenance operation for the reservoir tank for the radiator to be easily performed, and the external appearance of the front portion of the vehicle body to be improved.

The above and further objects and features of the invention will more fully be apparent from the following detailed description with accompanying drawings.

BRIEF DESCRIPTION OF DRAWINGS

FIG. 5 is a side view of a reservoir tank which is viewed from outside of the motorcycle of FIG. 1.

DESCRIPTION OF EMBODIMENTS

Hereinafter, the embodiment of the present invention will be described with reference to the accompanying drawings. The stated directions are referenced from the perspective of a rider straddling a motorcycle.

Figure 1:
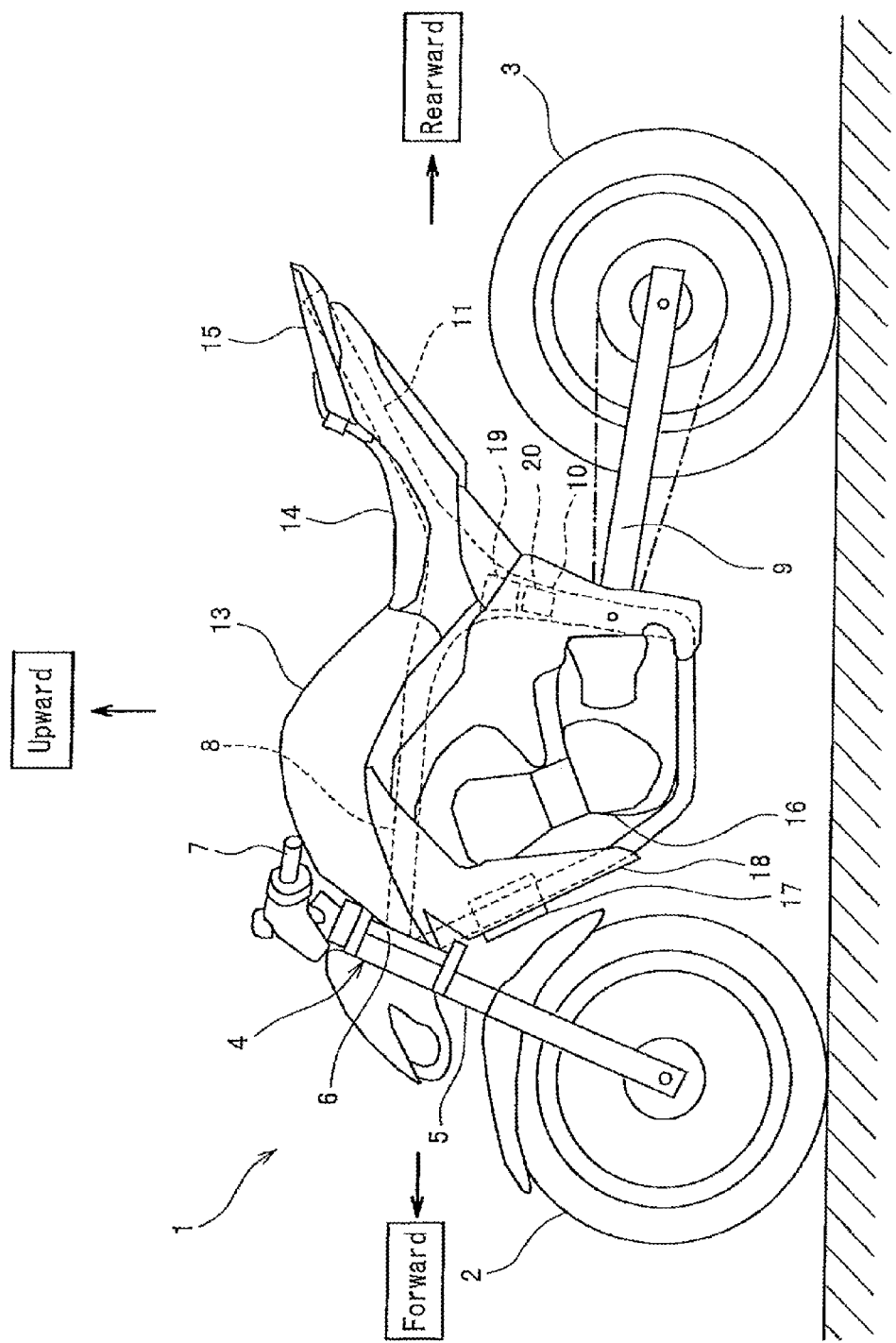
FIG. 1 is a left side view of a motorcycle according to the embodiment of the present invention.

FIG. 1 is a left side view of a motorcycle according to the embodiment of the present invention. As shown in FIG. 1, the motorcycle 1 includes a front wheel 2, a rear wheel 3, and a vehicle body frame 4. The front wheel 2 is rotatably mounted to the lower end portion of a front fork 5 extending substantially vertically. The front fork 5 is mounted to a steering shaft (not shown) via an upper bracket (not shown) provided at an upper end portion thereof. The steering shaft is rotatably supported by a head pipe 6 which is a constituent member of the vehicle body frame 4. A bar-type steering handle 7 extending in a rightward and leftward direction is attached to the upper bracket. When the rider rotates the steering handle 7, the direction of the front wheel 2 can be turned as desired around the steering shaft as a rotary shaft.

The vehicle body frame 4 includes the head pipe 6, a pair of right and left main frames 8 extending rearward from the head pipe 6, a pair of right and left pivot frames 10 which extend continuously from the rear portions of the main frames 8, respectively, and to which the front end portion of a swing arm 9 is mounted such that the swing arm 9 is pivotable, and a pair of right and left seat rails 11 extending rearward from the pivot frames 10, respectively. A rear suspension unit (not shown) is coupled to the swing arm 9 supporting the rear wheel 3.

A fuel tank 13 is located rearward relative to the steering handle 7 and fastened to the main frames 8. A front rider seat 14 and a rear passenger seat 15 are located rearward relative to the fuel tank 13 and detachably mounted to the seat rails 11.

Between the front wheel 2 and the rear wheel 3, a water-cooled engine 16 is mounted to the main frames 8 and the pivot frames 10. A radiator 17 is disposed obliquely above the engine 16. Also, a portion of the radiator 17 and a portion of the engine 16 are covered on the outside with a shroud 18. An ABS (anti-brake system) unit 19 and a reservoir tank 20 for the radiator 17 are disposed inward relative to the vehicle body frame 4 (pivot frames 10). In the present embodiment, the motorcycle 1 includes the ABS unit 19 as a brake control unit.

Figure 2:
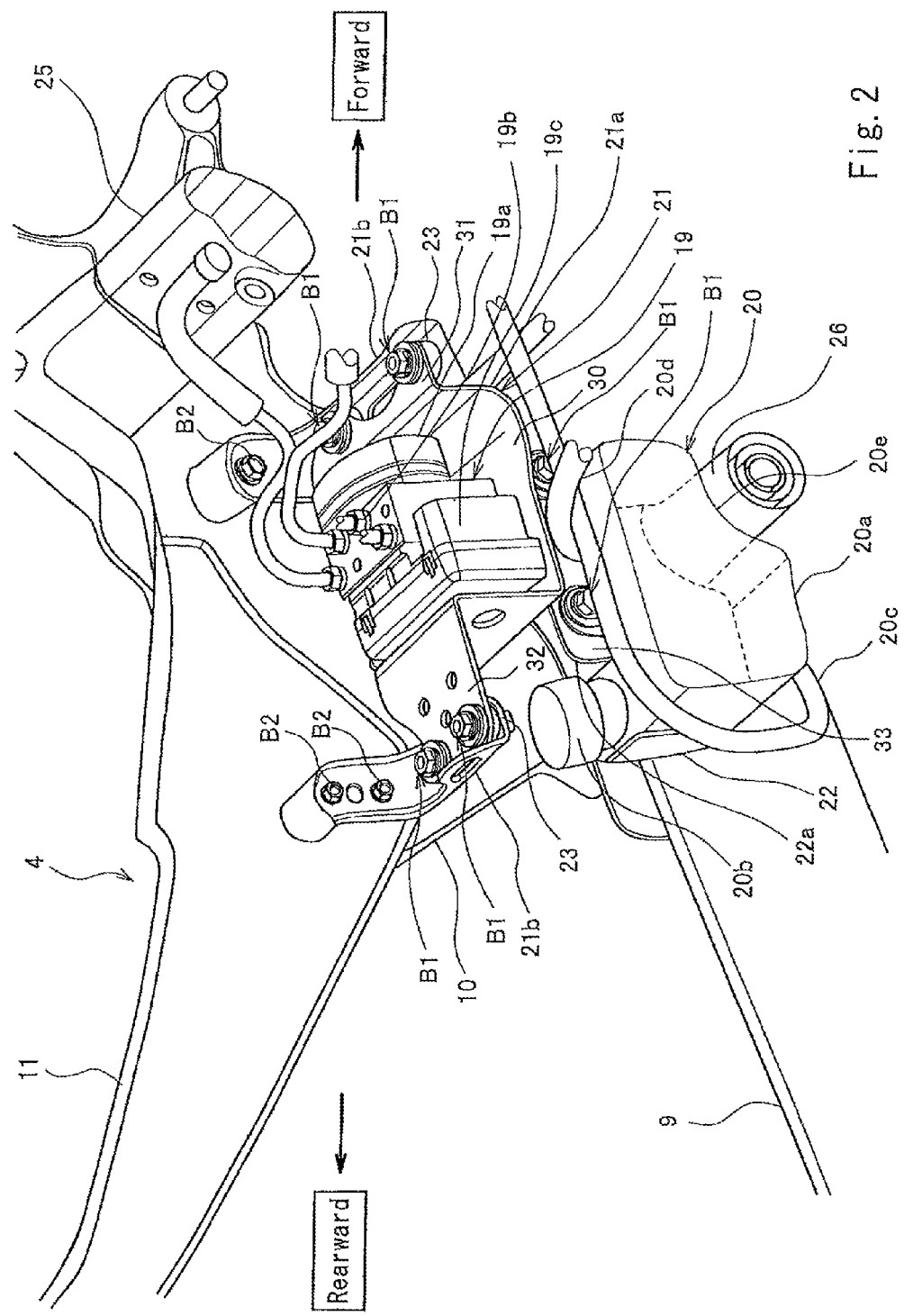
FIG. 2 is a perspective view of an ABS unit and a reservoir tank which are disposed inward relative to a vehicle body frame of FIG. 1.

FIG. 2 is a perspective view of the ABS unit 19 and the reservoir tank 20 which are disposed inward relative to the vehicle body frame 4 of FIG. 1. As shown in FIG. 2, the pair of right and left pivot frames 10 and the pair of right and left seat rails 11, which are constituent members of the vehicle body frame 4, are integrated, and the ABS unit 19 and the reservoir tank 20 are disposed inward relative to the right and left pivot frames 10 and the right and left seat rails 11 (between the right and left frames) in the vehicle width direction. In front of the ABS unit 19 and the reservoir tank 20, a cross member 25 connecting the right and left pivot frames 10 to each other is placed.

The ABS unit 19 is configured to control an ABS which reduces a hydraulic (fluid) brake pressure to prevent locking of a wheel, for example. In the example of FIG. 2, the ABS unit 19 includes a pump unit 19a including a pump for the ABS to increase the hydraulic brake pressure and a driving motor for driving the pump, a valve unit 19b containing a valve connected to four input/output ports, and a controller 19c for controlling the pump unit 19a and the valve unit 19b.

The reservoir tank 20 includes a container body 20a which stores therein a cooling medium (refrigerant) supplied to the radiator 17 and has a cooling medium port, and a cap 20b which closes the cooling medium port of the container body 20a. An output tube 20c used to guide the cooling medium to the radiator 17, and an overflow tube 20d, are connected to the container body 20a of the reservoir tank 20. The container body 20a and the cap 20b of the reservoir tank 20 are covered with a tank cover 22 made of a resin.

The ABS unit 19 and the reservoir tank 20 are disposed inward relative to the pivot frames 10 and mounted to the vehicle body frame 4 via a common bracket 21. In the present embodiment, the bracket 21 includes a main bracket 21a for retaining the ABS unit 19 and two sub-brackets 21b for attaching the main bracket 21a to the pivot frame 10 and the seat rail 11 integrated with the pivot frame 10.

The main bracket 21a includes a recessed section 30 which is recessed when viewed from a side, a front protruding section 31 protruding forward from the upper end of the recessed section 30, a rear protruding section 32 protruding rearward from the upper end of the recessed section 30, and a lower protruding section 33 protruding downward from the bottom portion of the recessed section 30. The ABS unit 19 is accommodated in the recessed section 30. The bottom surface of the recessed section 30 has a through-hole (not shown). The bottom portion of the ABS unit 19 is fastened to the main bracket 21a from a reverse side, by a screw inserted into the through-hole. In this configuration, the main bracket 21a can protect the ABS unit 19 against flying stones or the like, from the front, the rear, and below.

The front protruding section 31 of the main bracket 21a and the front sub-bracket 21b are fastened to each other by two bolts B1. The front sub-bracket 21b and the pivot frame 10 are fastened to each other by one bolt B2. The rear protruding section 32 of the main bracket 21a and the rear sub-bracket 21b are fastened to each other by two bolts B1. The rear sub-bracket 21b and the seat rail 11 are fastened to each other by two bolts B2.

The tank cover 22 for protecting the reservoir tank 20 and the reservoir tank 20 are unitarily mounted to the main bracket 21a. The lower protruding section 33 protruding downward from the bottom portion of the recessed section 30 of the main bracket 21a is fastened to an upper protruding section 22a protruding upward from the tank cover 22 and to the reservoir tank 20 by two bolts B1.

As should be understood from the above, the reservoir tank 20 is disposed below the main bracket 21a accommodating the ABS unit 19 and inward relative to the pivot frame 10. In this layout, unlike the conventional example, it becomes possible to prevent a situation in which the width of the shroud 18 in the front portion of the vehicle body is increased due to the reservoir tank 20. Since the width of the front portion of the vehicle body can be reduced in this way, the external appearance of the front portion of the vehicle body can be improved.

In the vicinity of the front end portion of the swing arm 9, in a region that is inward relative to the pivot frame 10, there is a space in which the swing arm 9 is pivoted. Through this space, the reservoir tank 20 placed inward relative to the pivot frame 10 is accessible. Therefore, a maintenance operation can be easily performed. Since the ABS unit 19 and the reservoir tank 20 are mounted to the vehicle body via the common bracket 21, the ABS unit 19 and the reservoir tank 20 are integrated as a sub-assembly by the bracket 21. Therefore, the components can be reduced in number, and the ABS unit 19 and the reservoir tank 20 can be efficiently mounted to the vehicle body at the same time.

The bottom wall of the reservoir tank 20 has a recessed section 20e which is recessed upward to avoid interference with a pivot shaft 26 supporting the front end portion of the swing arm 9 such that the swing arm 9 is pivotable. In this structure, the reservoir tank 20 is placed to overlap with the pivot shaft 26 when viewed from a rear (see FIG. 3), and the volume of the reservoir tank 20 can be increased.

The bracket 21 is connected to the vehicle body frame 4 via rubber dampers 23. In the present embodiment, the front protruding section 31 of the main bracket 21a and the front sub-bracket 21b are fastened to each other via the rubber damper 23 by two bolts B1 and connected to the pivot frame 10 via the rubber damper 23. The rear protruding section 32 of the main bracket 21a and the rear sub-bracket 21b are fastened to each other via the rubber damper 23 by two bolts B1 and connected to the seat rail 11 via the rubber damper 23.

The upper protruding section 22a of the tank cover 22 and an upper protruding section 20f of the reservoir tank 20 are fastened to the lower protruding section 33 of the main bracket 21a by two bolts B1.

In this configuration, it becomes possible to prevent a vibration from being transmitted from the vehicle body frame 4 to the main bracket 21a and hence to the ABS unit 19 and the reservoir tank 20. This can suppress the cooling medium stored in the reservoir tank 20 from being moved significantly.

As shown in FIG. 2, the front sub-bracket 21b and the pivot frame 10 are fastened to each other by a bolt B2, from above, and the rear sub-bracket 21b and the seat rail 11 are fastened to each other by the bolts B2 from above. This allows the ABS unit 19 and the reservoir tank 20 integrated by the bracket 21 to be inserted from above and fastened to the pivot frame 10 and the seat rail 11 by the bolts from above. Therefore, the ABS unit 19 and the reservoir tank 20 can be efficiently and easily mounted to the vehicle body frame 4.

The container body 20a of the reservoir tank 20 is disposed immediately below the ABS unit 19, and the cap 20b is disposed to be horizontally apart from the ABS unit 19. In the present embodiment, the cap 20b overlaps with the main bracket 21a when viewed from above, and is located below the rear protruding section 32 of the main bracket 21a. Thus, the rear protruding section 32 and the cap 20b are vertically spaced apart from each other. In this structure, an operator can insert a hand into a space formed between the rear protruding section 32 and the cap 20b to replenish the reservoir tank 20 with the cooling medium. In other words, since the space in which the operator performs an operation can be ensured in the vicinity of the cap 20b of the reservoir tank 20, the operator can easily detach the cap 20b and easily replenish the reservoir tank 20 with the cooling medium.

Figure 3:
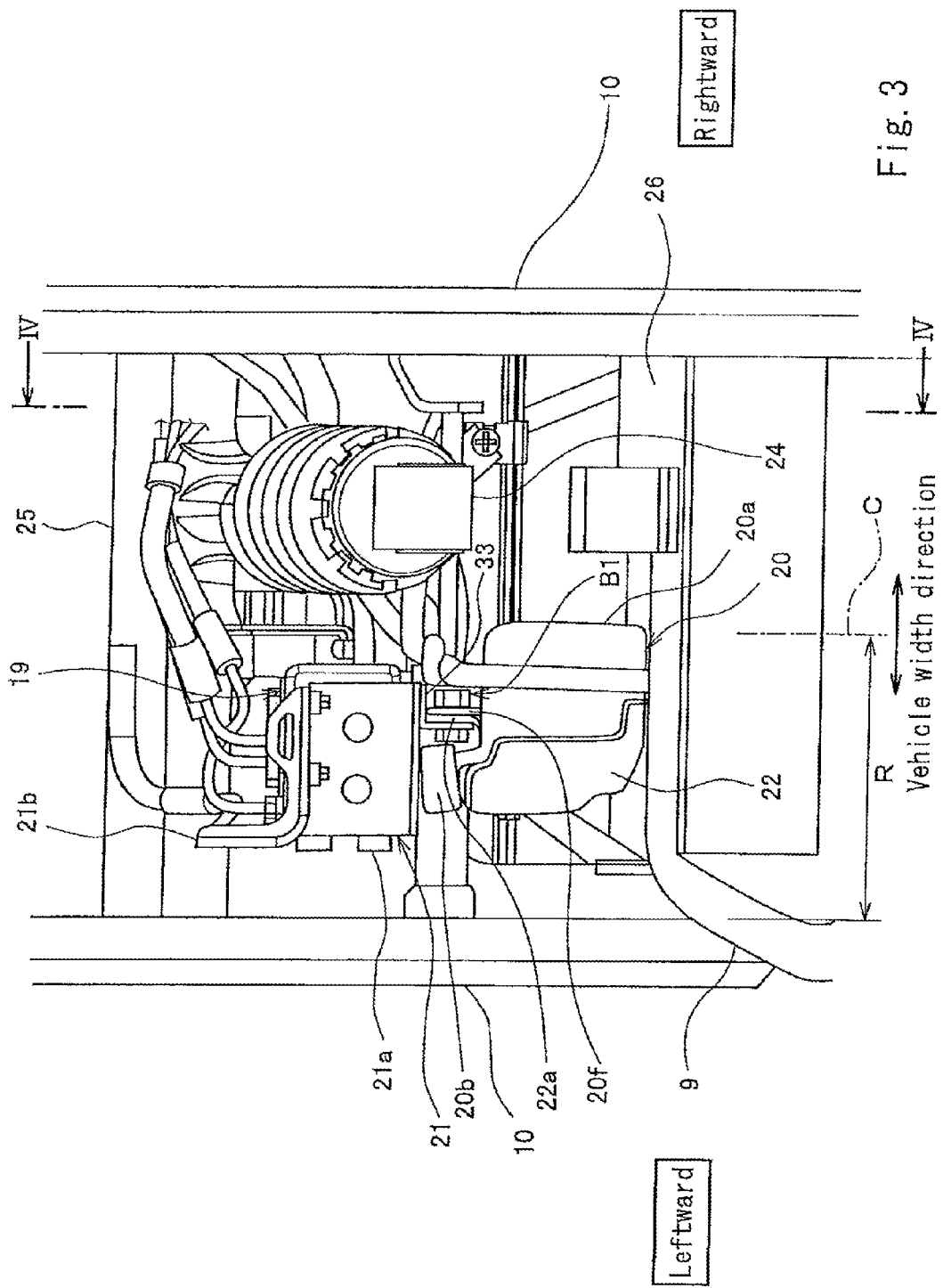
FIG. 3 is rear view of the ABS unit and the reservoir tank which are disposed inward relative to the vehicle body frame of FIG. 1.

FIG. 3 is rear view of the ABS unit 19 and the reservoir tank 20 which are disposed inward relative to the vehicle body frame 4. As shown in FIG. 3, the reservoir tank 20 and the ABS unit 19 are arranged to overlap with each other in the vertical direction. In the present embodiment, the reservoir tank 20 is placed on the lower portion of the ABS unit 19. The lower protruding section 33 of the main bracket 21a accommodating the ABS unit 19, the upper protruding section 22a of the tank cover 22, and the upper protruding section 20f of the reservoir tank 20 are fastened together and integrated laterally by the bolt B1. In this layout, when the components of the vehicle body are assembled, the reservoir tank 20 and the ABS unit 19 which are integrated by the bracket 21 can be inserted into a space formed between the right and left pivot frames 10 from above. Therefore, the components of the vehicle body can be assembled efficiently in a limited vehicle body space.

The reservoir tank 20 is disposed in a region R formed between the inner surface of the pivot frame 10 and a center C in the vehicle width direction and located closer to the center C in the vehicle width direction. In the present embodiment, the container body 20a of the reservoir tank 20 is disposed to overlap with a center line C. In this layout, since the reservoir tank 20 is disposed closer to the center in the vehicle width direction, it becomes possible to reduce shaking of the reservoir tank 20, and thereby suppress significant movement of a cooling medium stored in the reservoir tank 20, compared to a case where the reservoir tank 20 is disposed in a side portion in the vehicle width direction. Also, the cap 20b of the reservoir tank 20 is attached to the container body 20a in a posture which is inclined outward (in the present example, leftward) in the vehicle width direction. In this structure, the cap 20b is attached and detached in a direction that is inclined outward in the vehicle width direction with respect to the vertical direction. This allows the operator to attach and detach the cap 20b of the reservoir tank 20 from outside in the vehicle width direction, during the maintenance operation.

A rear suspension unit 24 is disposed at the right side of the ABS unit 19 and the reservoir tank 20. The ABS unit 19 and the reservoir tank 20 do not overlap with the rear suspension unit 24 when viewed from above. Therefore, when the components of the vehicle body are assembled, the reservoir tank 20 and the ABS unit 19 which are integrated by the bracket 21 can be inserted into a space formed between the pair of right and left pivot frames 10 from above, without an interference with the rear suspension unit 24.

Figure 4:
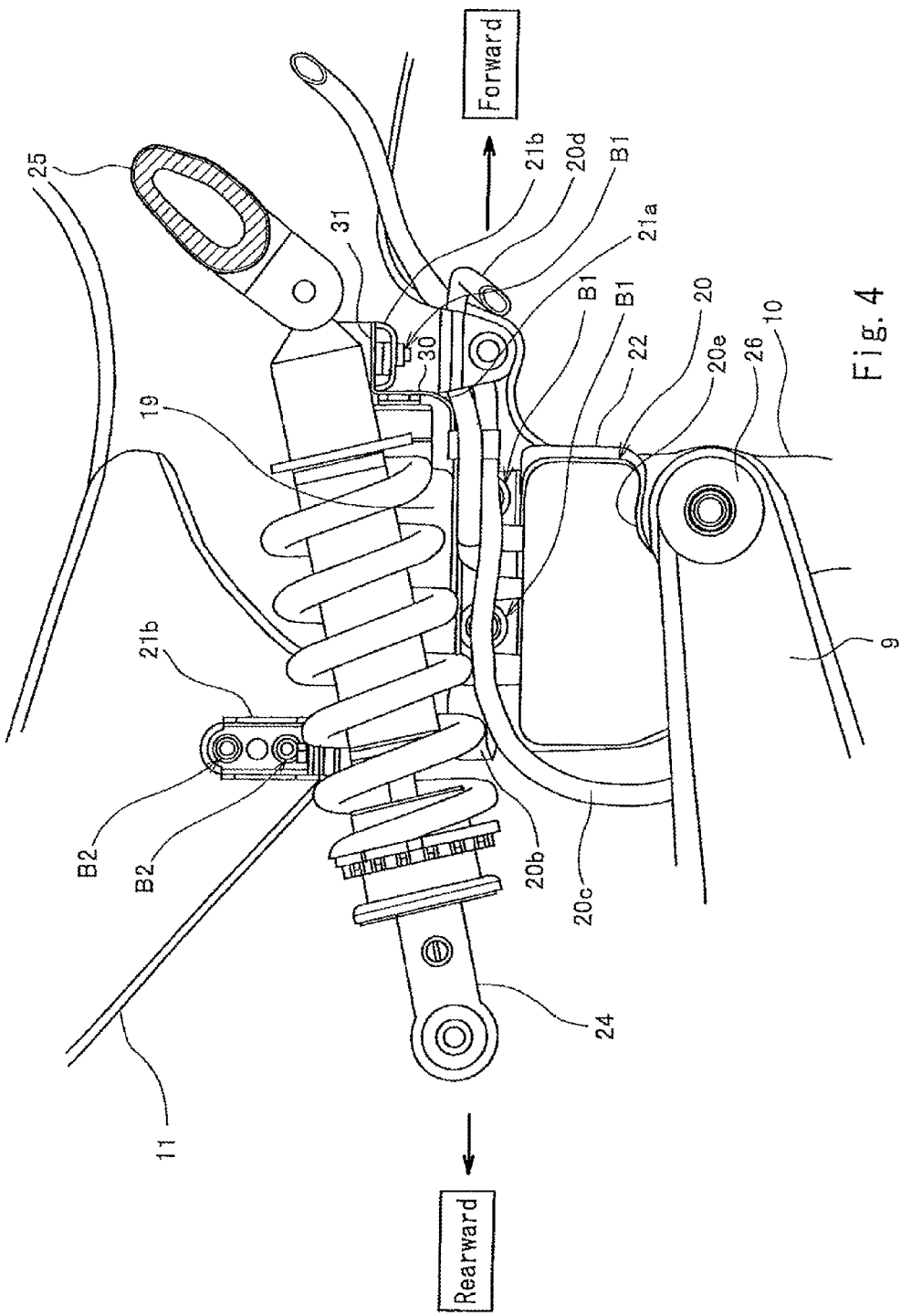
FIG. 4 is a cross-sectional view taken along line IV-IV of FIG. 3.

FIG. 4 is a cross-sectional view taken along line IV-IV of FIG. 3. As shown in FIG. 4, the rear suspension unit 24 is disposed to overlap with the ABS unit 19 when viewed from a side. The ABS unit 19 is accommodated in the recessed section 30 of the main bracket 21a. This allows the ABS unit 19 to be protected from flying stones or the like, by the bottom wall and side wall of the recessed section 30 of the main bracket 21a, and the rear suspension unit 24. One end of the rear suspension unit 24 is connected to the cross member 25, while the other end of the rear suspension unit 24 is connected to the swing arm 9 via a link member (not shown).

FIG. 5 is a side view of the reservoir tank 20 which is viewed from outside of the motorcycle 1 of FIG. 1. As shown in FIG. 5, the container body 20a of the reservoir tank 20 is covered with the pivot frame 10 when viewed from a side, while a portion of the tank cover 22 of the reservoir tank 20 and a portion of the cap 20b of the reservoir tank 20 protrude rearward from the pivot frame 10 when viewed from a side. Since at least a portion of the cap 20b of the reservoir tank 20 protrudes rearward from the pivot frame 10, the operator can easily access the reservoir tank 20 from the rear side of the pivot frame 10, easily detach the cap 20b, and easily replenish the reservoir tank 20 with the cooling medium.

Although in the present embodiment, the motorcycle including the ABS unit has been described, other brake control units, for example, a TRC (traction control) unit, may be incorporated instead of the ABS unit.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention can be used in a motorcycle including a water cooling system.

REFERENCE CHARACTER LIST

1 motorcycle
4 vehicle body frame
6 head pipe
8 main frame
10 pivot frame
11 seat rail
14 front seat
15 rear seat
16 engine
17 radiator
18 shroud
19 ABS unit (brake control unit)
20 reservoir tank
21 bracket
21a main bracket
21b sub-bracket
22 tank cover
23 rubber damper
24 rear suspension unit
25 cross member

The invention claimed is:

1. A motorcycle comprising:
a vehicle body frame including a head pipe, a pair of right and left main frames extending rearward from the head pipe, and a pair of right and left pivot frames which extend continuously from rear portions of the main frames, respectively, and to which a front end portion of a swing arm is mounted such that the swing arm is pivotable;
a brake control unit; and
a reservoir tank including a container body which stores therein a cooling medium supplied to a radiator and has a cooling medium port, and a cap which closes the cooling medium port of the container body,
wherein the brake control unit and the reservoir tank are disposed inward relative to the pivot frames, and mounted to the vehicle body frame via a common bracket of a plate shape, and
wherein the reservoir tank and the brake control unit are fastened to the common bracket in a state in which the reservoir tank is placed on one of a plurality of surfaces of the common bracket, and the brake control unit is placed on another surface of the plurality of surfaces of the common bracket.

2. The motorcycle according to claim 1,
wherein the reservoir tank is disposed in a region between an inner surface of the pivot frame and a center in a vehicle width direction and positioned closer to the center in the vehicle width direction.

3. The motorcycle according to claim 1,
wherein the bracket is connected to the vehicle body frame via a rubber damper.

4. The motorcycle according to claim 1,
wherein the reservoir tank and the brake control unit are arranged to overlap with each other in a vertical direction.

5. The motorcycle according to claim 4,
wherein the container body is disposed immediately below the brake control unit, and the cap is disposed to be horizontally apart from the brake control unit.

6. The motorcycle according to claim 1,
wherein when viewed from a side, the container body is covered with the pivot frame, and at least a portion of the cap protrudes rearward from the pivot frame.

\* \* \* \* \*